US008155111B2

(12) United States Patent
Chen et al.

(10) Patent No.: US 8,155,111 B2
(45) Date of Patent: *Apr. 10, 2012

(54) METHOD AND SYSTEM FOR EMPLOYING UNDERUTILIZED COMMUNICATION CHANNELS AS OUTBOUND GATEWAYS

(75) Inventors: Yihsiu Chen, Middletown, NJ (US); Mark Jeffrey Foladare, East Brunswick, NJ (US); Samuel Glazer, New York, NY (US); Shelley Betty Goldman, East Brunswick, NJ (US); Thaddeus Julius Kowalski, Summit, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 996 days.

This patent is subject to a terminal disclaimer.

(21) Appl. No.: 12/082,023

(22) Filed: Apr. 8, 2008

(65) Prior Publication Data

US 2008/0186959 A1 Aug. 7, 2008

Related U.S. Application Data

(63) Continuation of application No. 10/979,294, filed on Nov. 2, 2004, now Pat. No. 7,372,850.

(60) Provisional application No. 60/520,769, filed on Nov. 17, 2003.

(51) Int. Cl.
H04L 12/64 (2006.01)

(52) U.S. Cl. ........................................................ 370/356
(58) Field of Classification Search .................. 370/352, 370/353, 356
See application file for complete search history.

(56) References Cited

U.S. PATENT DOCUMENTS

| 6,160,883 | A  | * | 12/2000 | Jackson et al. | ............... | 379/230 |
| 6,414,952 | B2 | * | 7/2002  | Foley          | ............... | 370/352 |
| 6,738,470 | B1 | * | 5/2004  | Aronovitz      | ............... | 379/220.01 |
| 7,142,560 | B2 | * | 11/2006 | Mansfield      | ............... | 370/466 |
| 2004/0234059 | A1 | * | 11/2004 | Lazarus et al. | ........... | 379/202.01 |
| 2006/0018449 | A1 | * | 1/2006  | Stevens et al. | ............ | 379/93.05 |
| 2007/0286170 | A1 | * | 12/2007 | Khan et al.    | ............... | 370/356 |

* cited by examiner

*Primary Examiner* — Melvin Marcelo

(57) ABSTRACT

Disclosed is a method and system for employing underutilized communication channels as outbound gateways. A call from a calling terminal to a called terminal is routed to a first residential gateway at a first customer premises via a broadband data network and then routed from the first residential gateway to the called terminal via a local area network. The call is thereafter re-routed to a second residential gateway at a second customer premises via the broadband network and then routed from the second residential gateway to the called terminal via the local area network. The re-routing of the call via the second residential gateway may be in response to a determination that the first customer premises requires bandwidth (of either the broadband network or local area network) or other resources that are being used by the telephone call being routed via the first residential gateway. The call is thus re-routed via the second residential gateway in order to free up the resources needed by the first customer premises.

9 Claims, 4 Drawing Sheets

METHOD AND SYSTEM FOR EMPLOYING UNDERUTILIZED COMMUNICATION CHANNELS AS OUTBOUND GATEWAYS

This application is a continuation of prior application Ser. No. 10/979,294 filed Nov. 2, 2004 now U.S. Pat. No. 7,372,850, which claimed the benefit of U.S. Provisional Application No. 60/520,769 filed Nov. 17, 2003, both of which are incorporated herein by reference.

BACKGROUND OF THE INVENTION

The present invention relates generally to telecommunications, and more particularly to the utilization of underutilized communication channels as outbound gateways.

The public switched telephone network (PSTN) has provided reliable voice and data communication for many years. As is well known, the PSTN is a circuit switched network in which a call from a calling terminal to a called terminal creates a dedicated circuit between the two terminals. The circuit carries voice or data signals between the two terminals. For many years, the PSTN has been the primary form of telephony communication. Most homes and businesses today have at least one connection to the PSTN. The physical connection from a customer premises to the PSTN is referred to as the local loop. Most commonly, the local loop comprises twisted pair copper wire between the customer premises and the central office (CO) of a local exchange carrier (LEC). The twisted pair generally provides analog telephone service, but in some installations provide for high bandwidth communications via a digital subscriber line (DSL).

More recently, customer premises are also connected to other types of high bandwidth communication networks. For example, many homes have a connection to a cable television network, which is generally implemented using coaxial cable, optical fiber, or a combination of the two (e.g. hybrid fiber-coax (HFC)). Originally, the cable television network was used for downstream communications from a cable head end to the customer premises. More recently, such networks have been modified to provide bi-directional data transport in both the downstream and upstream directions.

The increase in connectivity to high bandwidth data networks has also led to the provisioning of new services over such networks. For example, telephony service is now available via a high bandwidth data connection (e.g., via the Internet) using voice-over-Internet-Protocol (VoIP). The VoIP protocol transmits encoded voice as data packets via a high bandwidth data network. The voice data is encoded and decoded at the endpoints (or at some intermediate network location) so that a voice conversation between two telephones may take place.

Since many customer premises now have connections to multiple networks, with one such network often being a high bandwidth network, there is often unused bandwidth between the customer premises and the one or more external networks. One use for such unused bandwidth is described in U.S. Pat. No. 6,738,470 (the "'470 patent"), which describes a technique for using one subscriber's DSL connection to route a digital telephone call to a PSTN phone without using a central office gateway to convert the call from the digital domain to the analog domain. The subscriber whose DSL connection is used as the gateway is called a "pass-through" subscriber, as the telephone call is passed through that subscriber's premises and equipment, but does not terminate there. In effect, this system uses unused bandwidth of a subscriber in order to utilize equipment at the customer premises as a gateway. One of the advantages of such a system, as described in the '470 patent, is that it avoids the cost of processing by a central gateway (e.g., the local telephone company). Thus, rather than utilizing a central gateway for processing a call, and paying for such processing, processing may be performed at a customer premises, thereby avoiding the cost of central gateway processing.

BRIEF SUMMARY OF THE INVENTION

While there are certain benefits to processing a call in accordance with the techniques of the '470 patent, some significant problems have been identified. For example, using a customer premises equipment as a pass-through gateway works well only so long as the customer premises acting as the pass-through gateway has sufficient unused resources (e.g., bandwidth and computing capability) to support the pass-through data flow, and only so long as such sufficient unused network resource availability continues.

The present inventors have realized, however, that while a customer premises may initially have sufficient available resources to act as a gateway, resource requirements change over time. As such, a customer's increased resource requirements may be unable to be fulfilled if the customer's resources are being used to handle a call between two other users in accordance with the above described pass-through technique of the '470 patent. The present invention solves this problem by providing a technique for re-routing a call to a called terminal via alternate residential gateways depending upon resource usage at the residential gateways.

In one embodiment of the invention a call from a calling terminal to a called terminal is routed to a first residential gateway at a first customer premises via a broadband data network and then routed from the first residential gateway to the called terminal via a local area network. The call is thereafter re-routed to a second residential gateway at a second customer premises via the broadband network and then routed from the second residential gateway to the called terminal via the local area network. In an embodiment in which the local area network is a public switched telephone network, the routing from the residential gateways to the called terminal comprises the step of initiate a telephone call from the residential gateways to the called terminal via a central office. In an embodiment in which the broadband network is an IP network, the residential gateway receives IP data packets containing voice data for the telephone call and converts the IP data packets into analog voice signals.

The re-routing of the call via the second residential gateway may be in response to a determination that the first customer premises requires bandwidth (of either the broadband network or local area network) or other resources that are being used by the telephone call being routed via the first residential gateway. The call is thus re-routed via the second residential gateway in order to free up the resources needed by the first customer premises.

These and other advantages of the invention will be apparent to those of ordinary skill in the art by reference to the following detailed description and the accompanying drawings.

DETAILED DESCRIPTION

Figure 1:
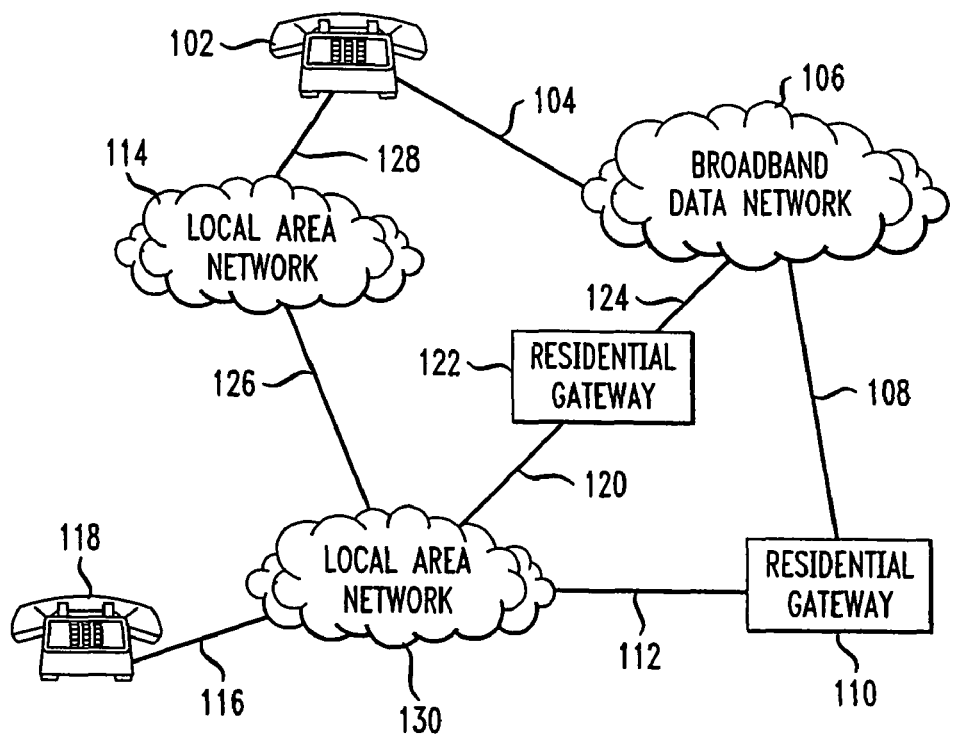
FIG. 1 shows a high level network diagram of a network in which the principles of the present invention may be implemented.

FIG. 1 shows a high level network diagram of a network in which the principles of the present invention may be implemented. FIG. 1 shows a calling terminal 102 connected to a broadband data network 106 via communication channel 104 and connected to a local area network 114 via communication channel 128. Local area network 114 is connected to local area network 130 via communication channel 126. Broadband data network 106 is connected to residential gateways 110 and 122 via communication channels 108 and 124 respectively. Residential gateways 110 and 122 are also connected to local area network 130 via communication channels 112 and 120 respectively. Called terminal 118 is shown connected to local area network 130 via communication channel 116. Calling terminal 102 and called terminal 118 may be, for example, telephones, or any other communication device. The communication channels shown in FIG. 1 may be direct connections, or they may be indirect communication channels with intermediate connections (or other networks) between the shown endpoints.

The residential gateways 110 and 122 represent devices which perform a gateway function as will be described in further detail below. These gateways may be implemented in various ways. The gateways may be dedicated devices that perform the required functions, or the gateways may be implemented using an appropriately programmed computer which may also perform other functions as well. The implementation of a gateway using hardware, software, or a combination of hardware and software in accordance with the principles of the present invention would be well known to one skilled in the art given the description herein.

The principles of the present invention are useful, for example, when calling terminal 102 places a call to called terminal 118, and either a direct connection using certain network service providers is unavailable, or for some other reason a direct connection using certain network service providers is undesirable. One reason such a direct connection using network service providers may be undesirable is that such a connection would require processing by a third party network provider which would charge an access or processing fee to process the connection. For example, consider calling terminal 102 placing a call to called terminal 118. The call could be completed via the two local area networks 114 and 130. However, assuming it may be undesirable to connect via these networks due to unavailability or cost of network elements within these networks, an alternative path may be desirable. For example, the call may be connected via broadband data network 106, through residential gateway 110, through local area network 130 and to called terminal 118. Although local area network 130 is used for this alternative routing, there may be reasons that routing via the residential gateway 110 through local area network 130 provides certain cost savings.

In an advantageous embodiment, residential gateway 110 is located at a customer premises. Given the state of current network connectivity, many customer premises (e.g., residential buildings and homes) have excess capacity in terms of both network bandwidth as well as processing capability. With respect to bandwidth, the residential gateway 110 may have a broadband connection to broadband data network 106 as well as a relatively lower bandwidth connection to local area network 130. It is likely that at least at some times this total bandwidth is underutilized. Similarly, if residential gateway is a standalone device, or an appropriately programmed computer, it is likely that at least at some times the processing capability of the residential gateway will be underutilized. These underutilized resources (i.e., bandwidth and processing capability) may be used to route a call from calling terminal 102 to called terminal 118 using the above described alternate path.

One problem with such alternate routing is that the resource requirements of the customer premises at which the residential gateway 110 is located may change over time. If customer premises resource requirements increase during a time when the customer premises resources are being used to route a call between calling terminal 102 and called terminal 118, there may be insufficient resources to satisfy the needs of the customer at the customer premises. This, of course, is an undesirable situation. While customers paying for bandwidth and processing capability at their premises may be willing to allow underutilized resources to be used to connect third party calls, such customers would be unwilling to allow such resource use if it meant that the customer premises resources may be unavailable when needed by the customer.

Figure 2:
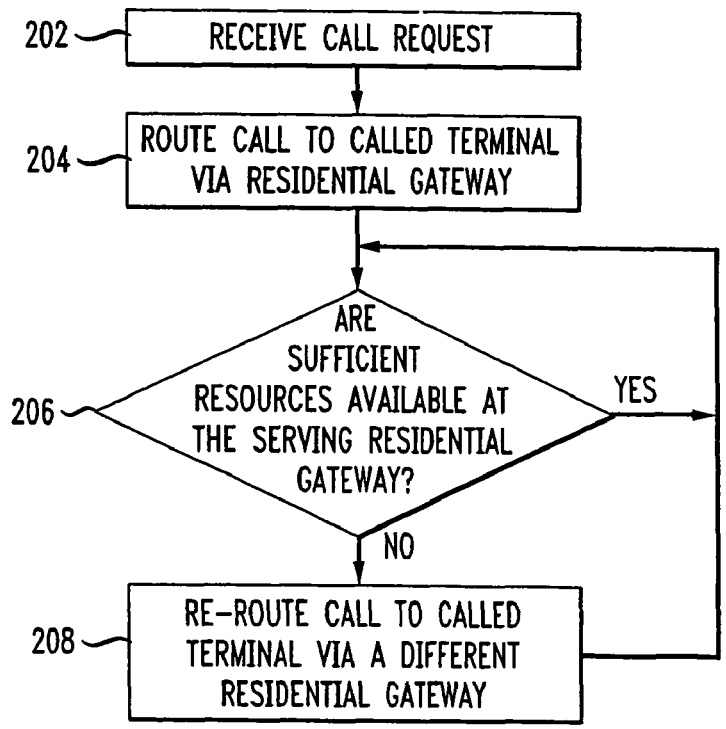
FIG. 2 shows a high level block diagram of a method for providing alternate residential gateway routing.

The present invention solves this problem by providing alternate residential gateway routing when resources which are currently being used to route a call between two other parties are now required by the residential gateway. FIG. 2 shows a high level block diagram of such processing. First, in step 202, a call request is received by a network node. In step 204, the call is routed to the called terminal 118 via a residential gateway (e.g., residential gateway 110). As used herein, the term serving residential gateway will be used to identify the particular residential gateway which is currently being used to route a call between two third parties. Next, in step 206, it is determined whether there continues to be sufficient resources available at the serving residential gateway to allow the serving residential gateway to continue to service the call between to the two third parties. As represented in FIG. 2, the serving residential gateway will continue to service the call so long as sufficient resources are available. Upon a determination that there are no longer sufficient resources available at the serving residential gateway to allow the serving residential gateway to continue to service the call between to the two third parties, then in step 208 the call will be re-routed from the calling terminal 102 to the called terminal 118 via a different residential gateway (e.g., residential gateway 122). Processing will then continue so long as the new serving residential gateway continues to have sufficient resources to handle the call between the two third parties. In this manner, underutilized resources at customer premises may be used to route calls between third parties, while accommodating changing resource requirements at the residential server. The call may be re-routed as often as necessary in this manner.

In various embodiments of the invention, there will generally be sufficient residential gateways with underutilized resources to allow the call between the third parties to be serviced without interruption. Of course, the number of available residential gateways will vary depending upon the particular implementation.

It is to be noted that the principles of the present invention may be implemented in various types of network configurations. For example, the broadband data network 106 may be any type of broadband network (e.g., the Internet) or combination of networks. Similarly, the local area network 130 may be any type of local area network (e.g., public switched telephone network (PSTN), wireless network, etc.).

Figure 3:
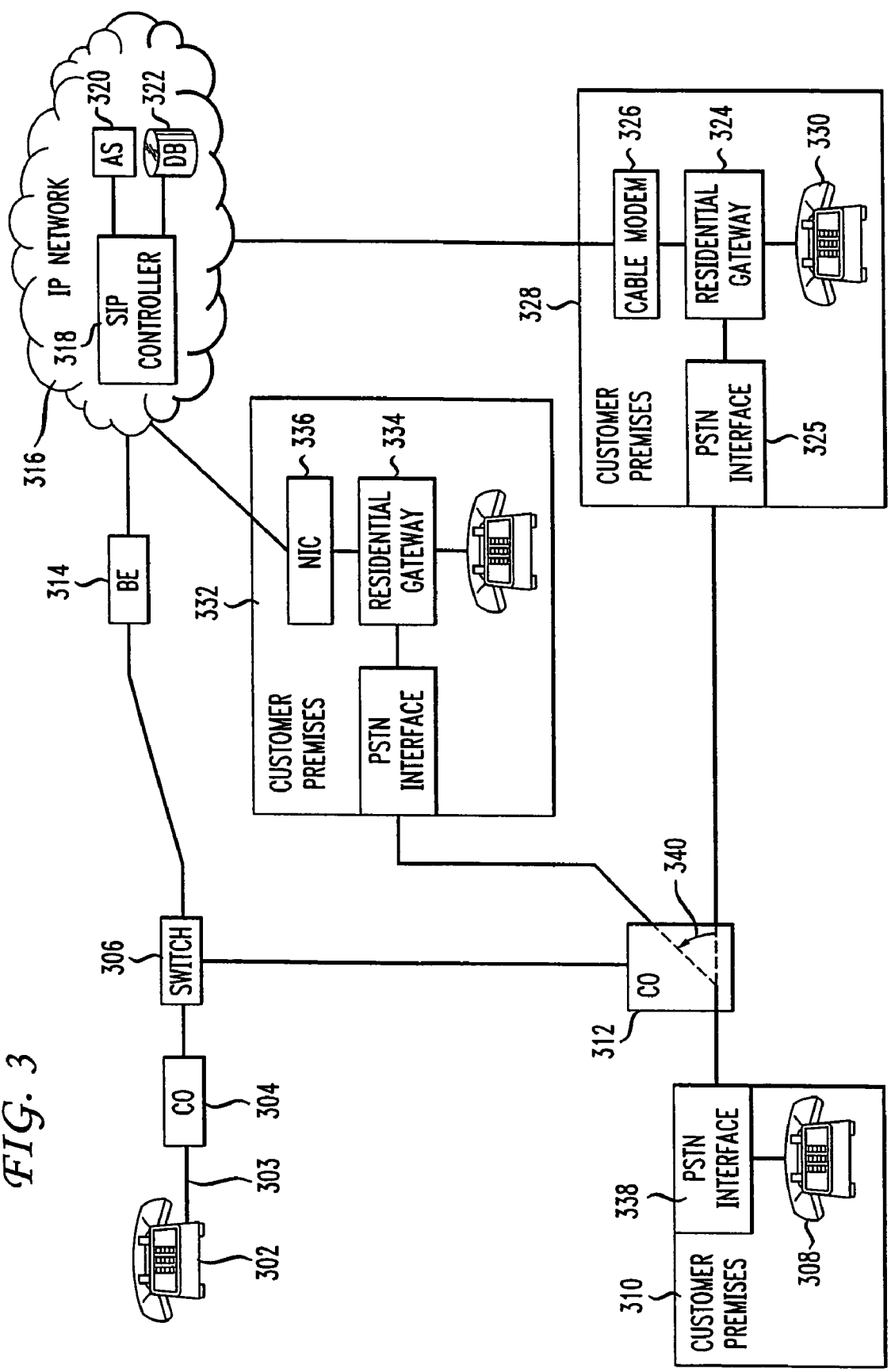
FIG. 3 shows a communication network in which the principles of the present invention may be implemented.

Having provided a high level description of the present invention in FIGS. 1 and 2, a more detailed description of one advantageous embodiment of the invention will now be described in conjunction with FIGS. 3, 4 and 5. FIG. 3 shows a communication network in which the principles of the present invention may be implemented. Calling telephone 302 is connected to a central office (CO) 304 in the PSTN via local loop 303. Assume telephone 302 goes off hook and dials the telephone number of called telephone 308 at customer premises 310. Assume for purposes of this example, that called telephone 308 is not connected to the same CO 304 as calling station 302. In accordance with conventional telephone routing, CO 304 would route the call to telephone switch 306, which may be, for example, a long distance switch operated by a long distance telephone company. The telephone switch 306 would then route the call to the terminating CO 312 which would then make the connection to called station 308 via PSTN interface 338. As discussed above, however, in some circumstances routing the call from switch 306 to CO 312 may be undesirable (e.g., because the service provider associated with CO 312 charges certain fees for such routing). In such a circumstance, alternate routing may take place as now described in conjunction with FIG. 4, which shows a flowchart of the steps performed in the network to provide alternate routing in accordance with the principles of the present invention. The steps of FIG. 4 will be described in conjunction with FIG. 3.

Figure 4:
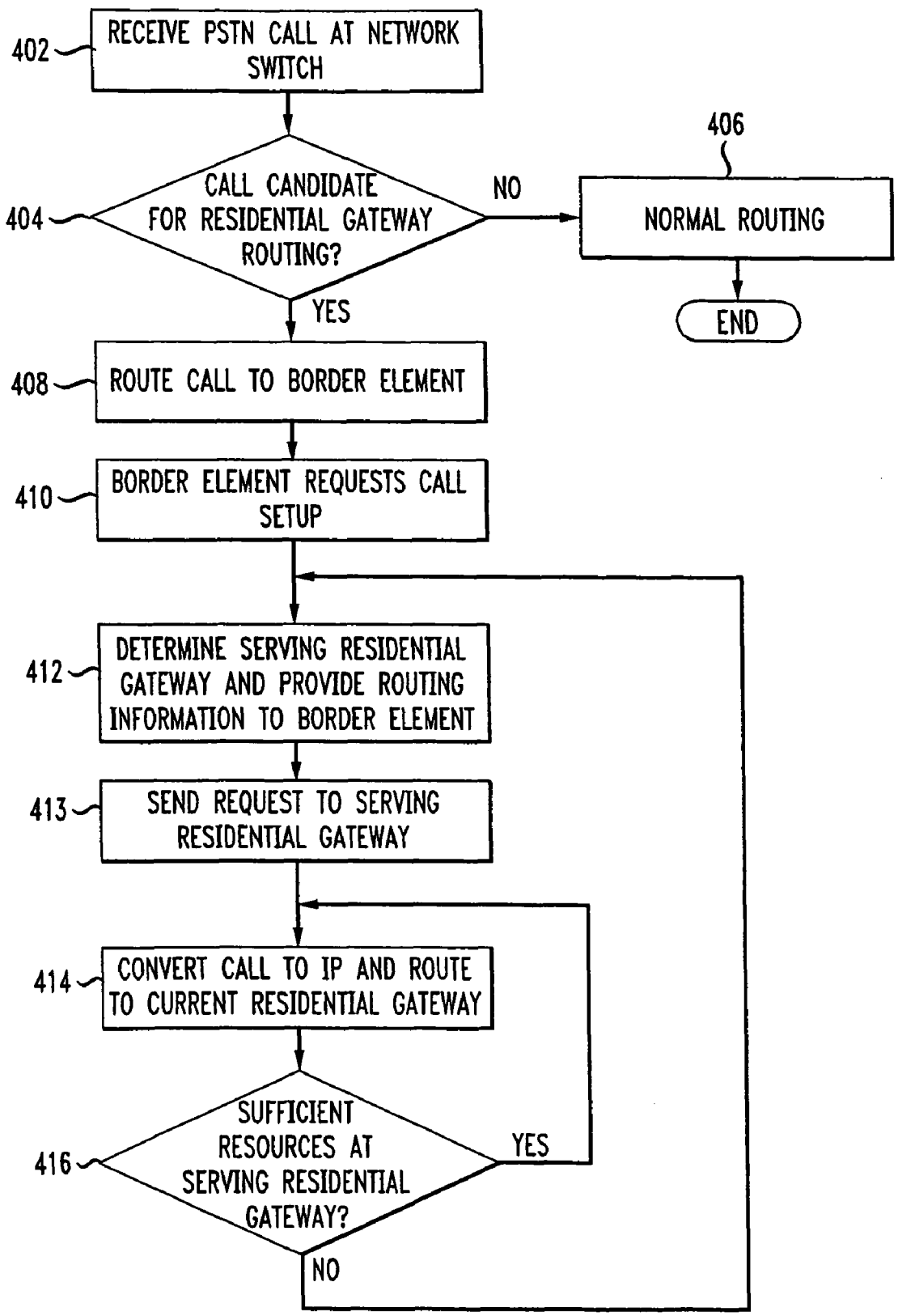
FIG. 4 shows a flowchart of the steps performed in the network to provide alternate routing in accordance with an embodiment of the invention.
Figure 5:
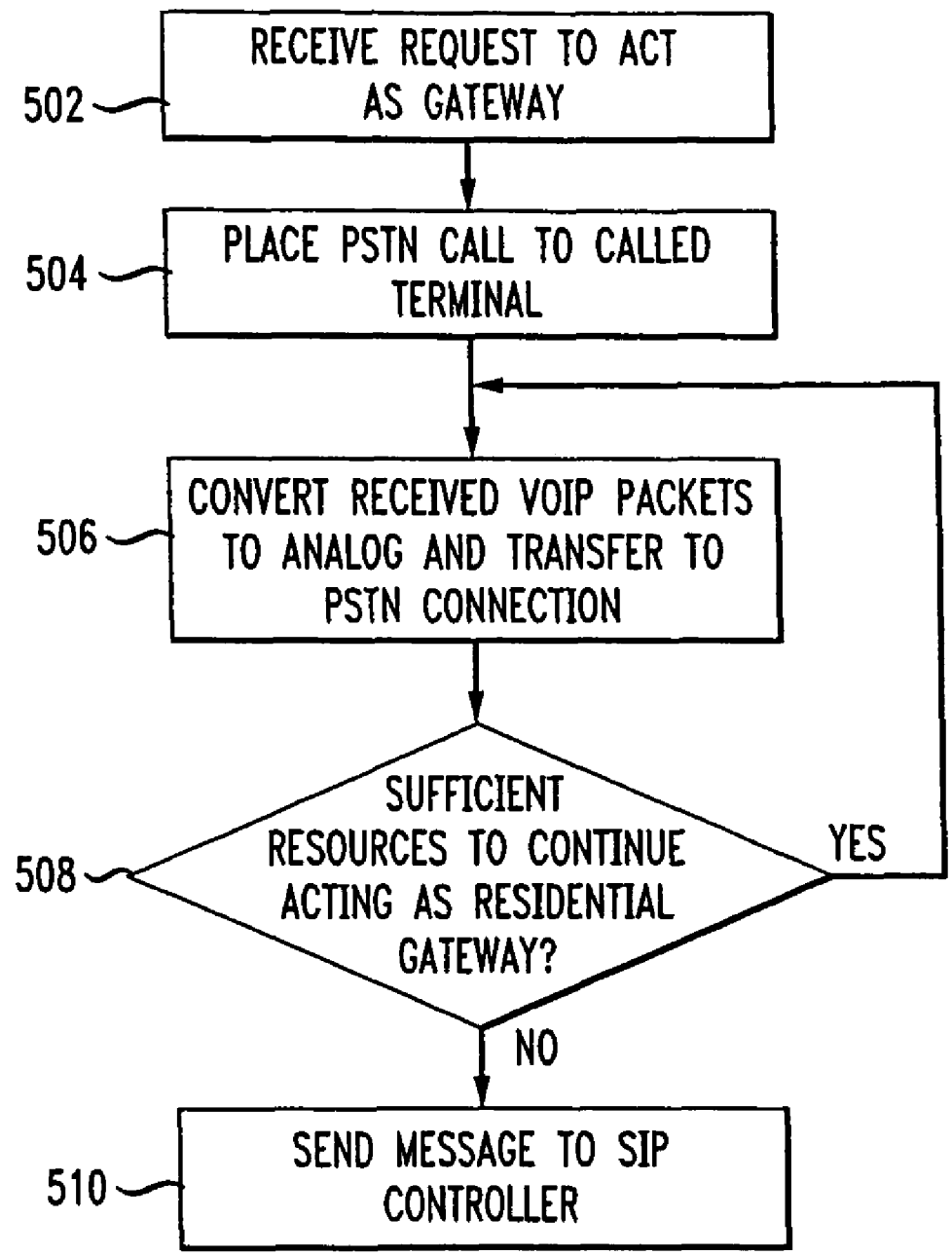
FIG. 5 shows a flowchart of the steps performed at the residential gateway to provide alternate routing in accordance with an embodiment of the invention.

Referring to FIG. 4, in step 402 a PSTN call is received from telephone 302 at switch 306 via CO 304. In step 404 the switch 306 determines whether the call is a candidate for residential gateway routing. In performing this step, switch 306 will determine the location of the telephone 308 and will determine whether residential gateway routing is available to this terminating telephone 308. If residential gateway routing is not available, then the call is routed in a conventional manner (e.g., via CO 312) in step 406 and processing ends. If it is determined in step 404 that the call is a candidate for residential gateway routing, then in step 408 the call is routed to border element (BE) 314. The BE is a network node which acts as a gateway between the PSTN and the internet protocol (IP) network 316. In accordance with an advantageous embodiment, network 316 utilizes the Session Initiation Protocol (SIP) in order to set up connections (e.g., Voice over IP (VoIP) calls) between terminals. SIP is a well known application-layer control protocol used to establish, modify and terminate sessions such as IP telephony calls. SIP is described in detail in Internet Engineering Task Force (IETF) Request for Comments (RFC) 3261; SIP: Session Initiation Protocol; J. Rosenberg, H. Schulzrinne, G. Camarillo, A. Johnston, J. Peterson, R. Sparks, M. Handley, E. Schooler; June 2002, which is incorporated by reference herein. The details of SIP will not be described herein, as the protocol is well known to those skilled in the art. The protocol will be described only insofar as necessary for an understanding of the present invention. In yet another embodiment of the invention, the IP network 316 may be designed in accordance with, and operate according to, a distributed feature composition (DFC) architecture as described in U.S. Pat. No. 6,160,883, entitled Telecommunications Network System and Method, which is incorporated herein by reference.

In step 410 the BE sends a request to the SIP controller 318 requesting call setup. The SIP controller 318 is an IP network node that controls the setup of VoIP calls. The SIP controller 318 is connected to an application server (AS) 320 and database (DB) 322. An application server is network logic which provides a particular network service. In the present description, AS 320 provides the logic for implementation of the residential gateway routing service. Thus, AS 320 represents a functional block, and such functionality may be implemented in various ways. For example, the AS 320 functionality may be implemented within the SIP controller 318 network node, or may be implemented in a different network node which contains the appropriate software and hardware for implementing the AS 320 functions.

The SIP controller 318 is also connected to database (DB) 322 which contains information used by the SIP controller 318 and the AS 320 in order to determine an appropriate residential gateway to use as the serving residential gateway for a particular call. For example, the DB 322 will contain information regarding all of the residential gateways which are available for use as serving residential gateways.

Returning now to step 412, the AS 320 will determine which residential gateway to use as the serving residential gateway for the current call. This determination is made by accessing the DB 322 for the list of available residential gateways. In one embodiment, the DB 322 also contains information regarding the resources available at each of the residential gateways in order to choose a serving residential gateway with underutilized resources. The DB 322 may maintain this information by receiving such activity information from the various residential gateways. The AS 320 will also take into account the location and network connectivity of the various residential gateways in choosing a residential gateway. Upon a determination of the serving residential gateway, the SIP controller 318 will provide routing information (e.g., IP address) of the serving residential gateway to the BE 314. Assume, for purposes of the present discussion, that the AS 320 has identified residential gateway 324 at customer premises 328 as an appropriate serving residential gateway. Residential gateway 324 is connected to the IP network 316 via a conventional cable modem 326 as is well known in the art. Thus, the routing information returned to the BE 314 by the SIP controller 318 is the IP address of residential gateway 324. The residential gateway may be implemented in various ways. The residential gateway may be a separate processing unit, or it may be a module (hardware, software, or a combination of hardware and software) incorporated into some other device (e.g., a personal computer).

In step 413 a request is sent by the SIP controller 318 to the chosen residential gateway to request that it act as the serving residential gateway. In step 414, the BE 314 converts the PSTN telephone signals received from switch 306 into data packets for transmission via the IP network 316. In accordance with the routing information received from the SIP controller 318 in step 412, the BE 314 transmits the data packets carrying the voice call to the residential gateway 324. Step 416 represents the step of monitoring (either active monitoring or passive monitoring in response to a message received from the residential gateway) to make sure that the serving residential gateway 324 continues to have sufficient resources to continue serving the call. So long as serving residential gateway 324 continues to have sufficient resources, the BE 314 will continue to route the voice packets to serving residential gateway 324.

Upon a determination in step 416 that the serving residential gateway 324 no longer has sufficient resources (as described below in connection with step 508 of FIG. 5), then control passes again to step 412 during which the AS 320 will determine an alternate residential gateway to use as the new serving residential gateway for the current call. This determination is again made by accessing the DB 322 for the list of currently available residential gateways. Upon a determination of the alternate residential gateway, the IP address of the alternate residential gateway is provided to the BE 314 and in step 414 the BE now sends the voice packets to the new serving residential gateway. With reference to FIG. 3, assume that the AS 320 identifies the residential gateway 334 as the alternate serving residential gateway upon a determination that residential gateway 324 no longer has sufficient resources to act as the serving residential gateway. In such a case, then steps 413 through 416 are repeated with residential gateway 334 as the serving residential gateway and the BE 314 will begin sending the voice data packets to residential gateway 334 via network interface card (NIC) 336 at customer premises 332. NIC 336 is shown at customer premises 332 to illustrate that various types of network connections are available between the customer premises and the IP network 316.

Having described the network processing for choosing a serving residential gateway (in this example residential gateway 324) and routing voice packets to the serving residential gateway, the processing steps which take place at the residential gateway will now be described in conjunction with the flowchart of FIG. 5. In step 502 the residential gateway 324 receives the request to act as the serving residential gateway that was sent by the SIP controller in step 413. This request includes an identification (e.g., telephone number) of the called telephone 308. In step 504 the serving residential gateway 324 places a PSTN telephone call to the called telephone via PSTN interface 325 and CO 312. In step 506 the serving residential gateway 324 converts voice data packets received from the BE 314 to analog voice signals and transfers the analog voice signal to the PSTN connection which was set up in step 504. As represented by step 508, the conversion and forwarding of voice signals to the PSTN connection continues so long as the serving residential gateway continues to have sufficient resources to continue acting as the servicing residential server.

As described above, there are several reasons why a residential gateway may initially have sufficient resources to initially act as the serving residential gateway but thereafter no longer have such available resources. One example is if the connection to the broadband network was initially unused, but at a later time a user at the customer premises 328 initiates use of the broadband connection (e.g., for web browsing, email, VoIP telephone call, etc.). It is possible that there is insufficient bandwidth to the broadband network in order to support both the customer use as well as the third party call processing as described above. In such a case, the residential gateway, which is configured to recognize the conflict, sends a message to the SIP controller 318 (step 510) indicating that it no longer has sufficient resources to act as the serving residential gateway to the third party call (this is the message which triggers the "NO" branch of decision 416). Another example of the residential gateway not having sufficient resources to continue acting as the serving residential gateway is if the connection to the PSTN network is needed for either an incoming PSTN call to the telephone 330 at the customer premises 328 or an outgoing PSTN call from the telephone 330 at the customer premises 328. In this case, it is the bandwidth to the PSTN network (e.g., the local loop) that is insufficient to support both the new telephone call and the existing third party telephone call. Again, the residential gateway is configured to recognize this situation and send a message to the SIP controller 318 indicating that it no longer has sufficient resources to act as the serving residential gateway to the third party call. While the above two situations are examples of lack of sufficient bandwidth, there is also the possibility that the residential gateway 324 will lack sufficient processing capability to continue acting as the serving residential gateway. For example, consider the embodiment in which the residential gateway 324 is implemented as a module of a personal computer located at the customer premises 328. In many situations, the processing capability of a personal computer is sufficient to multitask the serving residential gateway task as well as other tasks that may be required for the computer. However, a processor intensive task initiated at the computer may result in the computer lacking sufficient processing capability to support both the processor intensive task and the third party telephone call. Again, the residential gateway is configured to recognize this situation and send a message to the SIP controller 318 indicating that it no longer has sufficient resources to act as the serving residential gateway to the third party call.

As described above, upon receipt by the SIP controller 318 of an indication that serving residential gateway 324 lacks sufficient resources to continue acting as the serving residential gateway, alternate residential gateway 334 is chosen as the serving residential gateway. When residential gateway 334 is chosen, it receives the request in step 502 (FIG. 5) and then residential gateway 334 begins processing the call in accordance with the steps of FIG. 5 as described above.

It is noted that during the transfer of call processing from residential gateway 324 to residential gateway 334, there is also a need for a transfer of the PSTN connection of called station 308. More particularly, the connection between called station 308 and residential gateway 324 via CO 312 must be transferred to a connection between the called station 308 and residential gateway 334 via CO 312. This transfer occurs at the CO 312 as represented by arrow 340. Further, the transfer must occur synchronously with the transfer of processing from residential gateway 324 to residential gateway 334 such that the transfer is seamless and imperceptible by the participants to the call between telephone 302 and telephone 308. In the embodiment shown in FIG. 3 in which the residential gateways connect the call via the PSTN, the residential gateway 334 initiates a telephone call to called station 308 via CO 312. SIP controller 318 sends a call waiting tone to residential gateway 324 which then sends the call waiting tone to called station 308. The user of called station 308 hears the tone and triggers switching of the line. Alternatively, the call waiting tone along with a switch message may be sent to the CO 312 in such a way that the CO 312 switch reacts and switches the calls but the user of called station does not hear the tone. Once the call is appropriately switched, residential gateway 324 drops the call. Alternatively, if called station 308 were connected to residential gateways 334 and 324 via a wireless LAN (or equivalent), then the call switching may be accomplished by residential gateway 334 conferencing into the existing connection between residential gateway 324 and called station 308. Residential gateway 324 would then drop off the call.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

Those skilled in the art could implement various other feature combinations without departing from the scope and spirit of the invention.

The invention claimed is:

1. A method for routing a telephone call from a calling terminal to a called terminal via residential gateways comprising:
    routing said call to a first residential gateway via a broadband data network while said first residential gateway continues to have sufficient resources to serve the call;
    determining that said first residential gateway no longer has sufficient resources to serve the call; and
    routing said call to a second residential gateway via said broadband network in response to said determining that said first residential gateway no longer has sufficient resources to serve the call.

2. The method of claim 1 wherein said first and second residential gateways route said call to said called terminal via a local area network.

3. The method of claim 1 wherein said step of determining that said first residential gateway no longer has sufficient resources to serve the call comprises:
    receiving a message from said first residential gateway.

4. The method of claim 1 wherein said step of determining that said first residential gateway no longer has sufficient resources to serve the call comprises:
    monitoring said first residential gateway.

5. The method of claim 1 further comprising the step of:
    determining that said second residential gateway no longer has sufficient resources to serve the call; and
    routing said call to a third residential gateway via said broadband network in response to said determining that said second residential gateway no longer has sufficient resources to serve the call.

6. The method of claim 5 wherein said first, second and third residential gateway route said call to said called terminal via a local area network.

7. The method of claim 1 wherein said call is routed via said broadband data network using SIP protocol.

8. The method of claim 1 wherein said broadband data network operates according to a distributed feature composition architecture.

9. The method of claim 1 wherein said telephone call is initiated by said calling terminal as an analog PSTN call, said method further comprising the steps of:
    receiving said call from said calling terminal; and
    converting said analog PSTN call to an internet protocol telephone call.

* * * * *